United States Patent [19]
Dixon et al.

[11] Patent Number: 6,034,324
[45] Date of Patent: Mar. 7, 2000

[54] MODULAR HIGH TEMPERATURE SUPERCONDUCTING DOWN LEAD WITH SAFETY LEAD

[75] Inventors: Kelly Dale Dixon, Concord, Va.; Ralph C. Neimann, Downers Grove, Ill.; Christopher Mark Rey, Lynchburg, Va.

[73] Assignee: BWX Technology, Inc., Lyunchburg, Va.

[21] Appl. No.: 08/968,432

[22] Filed: Nov. 12, 1997

Related U.S. Application Data

[63] Continuation of application No. 08/527,121, Sep. 12, 1995, abandoned.

[51] Int. Cl.[7] .................................................. H01B 12/00
[52] U.S. Cl. ..................... 174/15.4; 505/706; 505/220; 505/885; 505/886
[58] Field of Search ..................... 505/883, 884, 505/885, 886, 875, 856, 700, 704, 706, 220, 230; 174/15.4, 15.5, 125.1; 62/51.1

[56] References Cited

U.S. PATENT DOCUMENTS

| | | | |
|---|---|---|---|
| 3,760,092 | 9/1973 | Woolcock et al. .................... | 174/15.5 |
| 4,895,831 | 1/1990 | Laskaris .................................. | 505/163 |
| 5,012,217 | 4/1991 | Palkovich et al. ..................... | 335/301 |
| 5,149,686 | 9/1992 | Ekin et al. ............................. | 505/220 |
| 5,151,406 | 9/1992 | Sawada et al. ........................ | 505/231 |
| 5,319,154 | 6/1994 | Kermarrec ............................. | 174/15.5 |
| 5,324,891 | 6/1994 | Huang et al. .......................... | 174/15.4 |
| 5,432,297 | 7/1995 | Dederer et al. ........................ | 174/15.5 |

*Primary Examiner*—Kristine Kincaid
*Assistant Examiner*—Kamand Cuneo
*Attorney, Agent, or Firm*—Robert J. Edwards

[57] ABSTRACT

A self-protected modular high temperature superconducting (HTS) down-lead that is capable of carrying large currents from a room temperature power source to a superconducting device operating at cryogenic temperatures. This down-lead incorporates a safety lead capable of carrying current and absorbing heat to protect the HTS material of the lead in the event of catastrophic failure of the HTS elements. The lead is in continuous contact with the HTS material and provides protection from interrupts and excess current. The down-lead is modular in design, and parts are easily replaced. Further, the down-lead is cooled through conduction in the middle stage, and gas cooled in the upper and lower stages by independent gas sources.

21 Claims, 6 Drawing Sheets

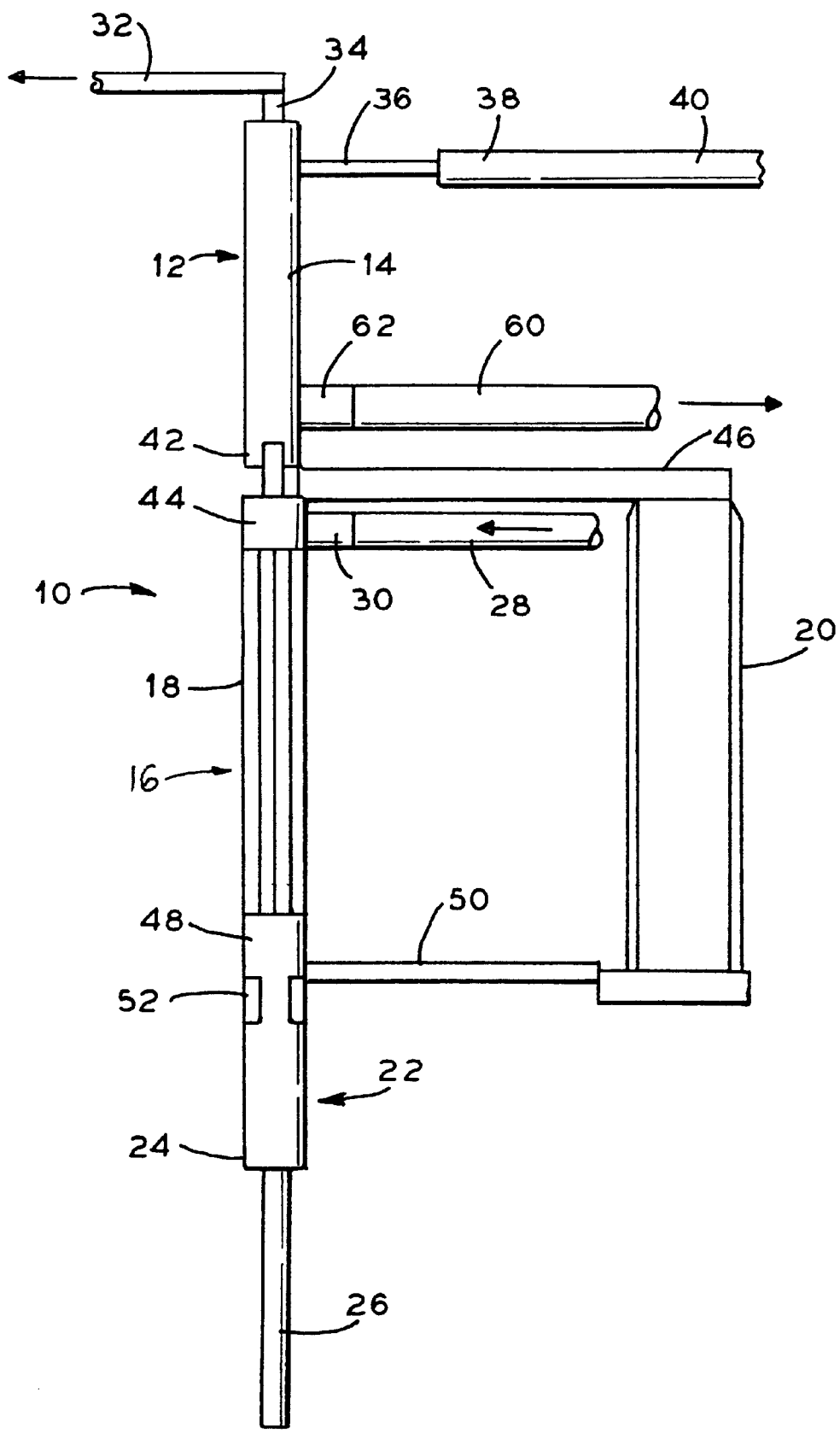

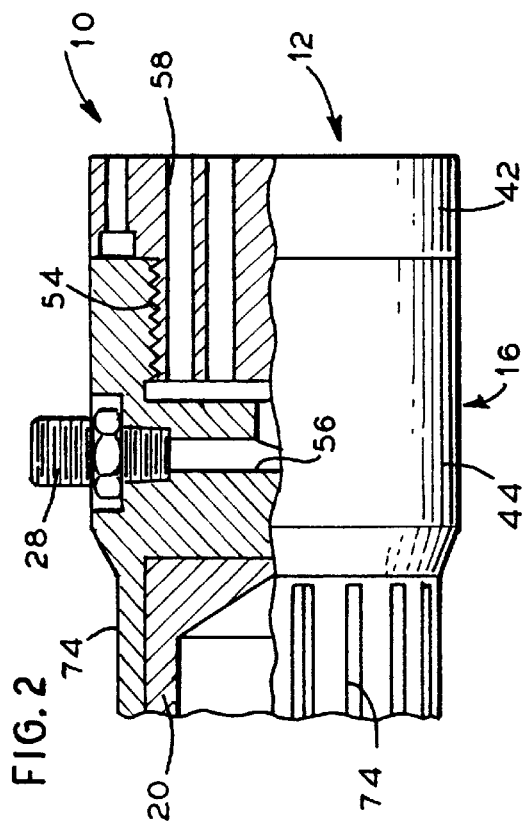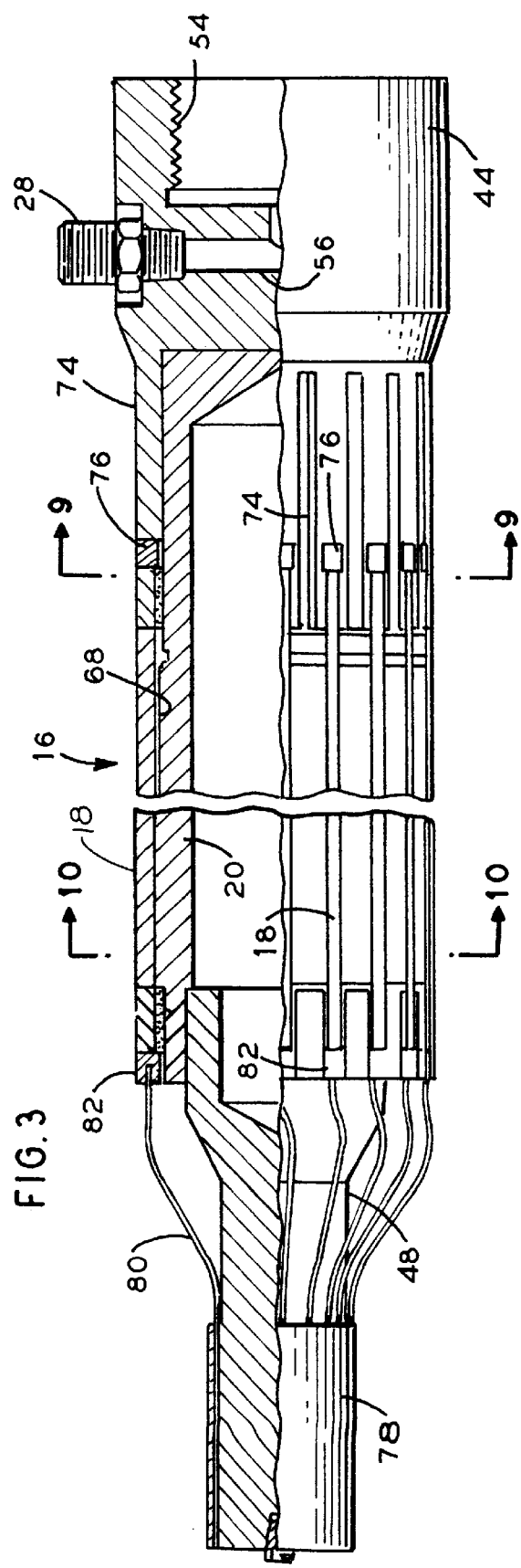

MODULAR HIGH TEMPERATURE SUPERCONDUCTING DOWN LEAD WITH SAFETY LEAD

This is a continuation of application Ser. No. 08/527,121 filed Sep. 12, 1995 now abandoned.

FIELD OF THE INVENTION

The present invention relates generally to the field of superconductors, and more specifically, to modular high temperature superconducting (HTS) down-leads used to carry a broad range of currents between superconductor material at very low or cryogenic temperatures and power sources at non-superconducting or room temperatures.

BACKGROUND OF THE INVENTION

Conventional down-leads have been known for some time now, and a variety of papers and articles detail their design, including: Yu. L. Buyanov, et al., *Cryogenics*, 15 p. 193–200 (1975); Yu. L. Buyanov, *Cryogenics*, 25 p. 94–110, (1985); H. L. Nan, *Cryogenics*, 23, p. 501–507 (1983); and, J. J. Alff, *Proc.* 9th International Conf. on Magnet Technology, September 1985.

There are also many articles relating to the design of high temperature superconducting current down-leads, among them: F. J. Mumford, *Cryogenics* 29 p. 206–207 (1989); J. R. Hull, *IEEE Transactions Appl. Supercond.*, 3 p. 869–875 (1993); R. Wesche and A. M. Fuchs, *Cryogenics*, (1994); A. Matrone, et al., IEEE *Transactions Magn.*, 25 p. 742–1745, (1989); and, M. A. Green, *Cryogenics*, 30S p. 679–683 (1990).

Very low temperatures are necessary to enable superconducting material to exhibit its properties. However, power must be supplied to these superconducting devices operating at cryogenic temperatures and most power sources are often at room temperature, or about 300 K. In order to drop the temperature of the power conductors and/or connections to the operating range of the superconductor material (which is about 4 k) and then maintain that temperature, supercooled liquids are often used. This is because the large currents that the conductors carry generate heat due to their resistive properties. Superconductor leads must isolate the heat generated by these large currents with thermal insulators, but instabilities and heat leaks from the material can still occur.

Heat leaks also occur in superconductors as a result of connections between the low temperature superconductor (LTS) and the high temperature superconductor (HTS). Even small thermally conductive areas in the electrical leads can cause large heat leaks into the supercooled regions that will disrupt the operation of the superconductor.

In U.S. Patent 5,324,891 to Huang et al., a superconducting lead with a thermal plug is disclosed. The invention therein consists of multiple strands of superconducting material in contact with a stainless steel and copper alloy laminae along the length of the strands. This copper/stainless steel laminae acts as a safety lead whose purpose is to add thermal mass in order to help prevent the lead from losing its superconductive properties. The ends of the strands contact conductors that are at different temperatures. Liquid nitrogen is used to cool the warm end of the lead and liquid helium cools the cold end. This lead allows a room temperature power source to be connected to a superconducting material.

Problems with this type of lead are found in its ability to handle current variances and its lack of an electrical safety lead. Also, if one of the HTS tapes used in the lead fails, it is difficult, if not impossible, to remove and replace it. Furthermore, there are no provisions for the safety lead of this device to also carry current, it is designed solely to provide additional thermal mass.

It is thus an object of this invention to provide a superconductor lead that has a safety lead incorporated therein that does not adversely affect the superconducting properties of the HTS material used in the lead. Another object of the present invention is to provide a lead wherein the components of the lead are modular and may be attached and detached from one another with relative ease. A further object of the invention is to provide for greater strain relief on the HTS elements as they are cooled to operating temperatures. Another object of the invention is to incorporate a safety lead that provides both thermal mass and an electrical bypass to the HTS material. Still another object of the invention is to provide independent, and improved, gas cooling means to the modular segments. Yet another object of the invention is to provide a means of removing and/or rotating the individual HTS elements depending on the magnetic characteristics desired.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

SUMMARY OF THE INVENTION

This invention pertains to a three-stage self-protected modular high temperature superconducting down-lead that is used in transmitting large currents from a room temperature source down to a device operating at cryogenic temperatures. The first or upper stage has a warm end, a cold end, and a gas cooled conducting material therebetween. This warm end is generally at room temperature while the cold end is generally at a cryogenic temperature. The upper stage further incorporates removable electrical connectors that allow for connection with the conducting material at both the warm and cold ends. The second or middle stage incorporates a current distributor at the warm end thereof and a current collector at the cold end thereof. This middle stage further consists of a safety lead that is transposed or extends between the current distributor and the current collector with at least one high temperature superconducting element located within a longitudinal groove formed within and along the safety lead. The warm end of this middle stage further incorporates a removable electrical connector for electrically connecting this middle stage to the upper stage. Furthermore, the cold end of this middle stage incorporates a low temperature superconducting cable that connects each high temperature superconducting element to a cold end connector. The third or lower stage incorporates a removable electrical connector that connects the lower stage to the cold end connector of the middle stage.

BRIEF DESCRIPTION OF THE DRAWINGS

FIG. 1 is a hybrid schematic diagram of the three stages of the down-lead.

FIG. 2 is a side pictorial view of the connection between the warm end of the middle stage and the cold end of the upper stage.

FIG. 3 is a side pictorial view of the middle stage of the down-lead, with parts cut away.

DESCRIPTION OF THE PREFERRED EMBODIMENTS

Figure 3A:
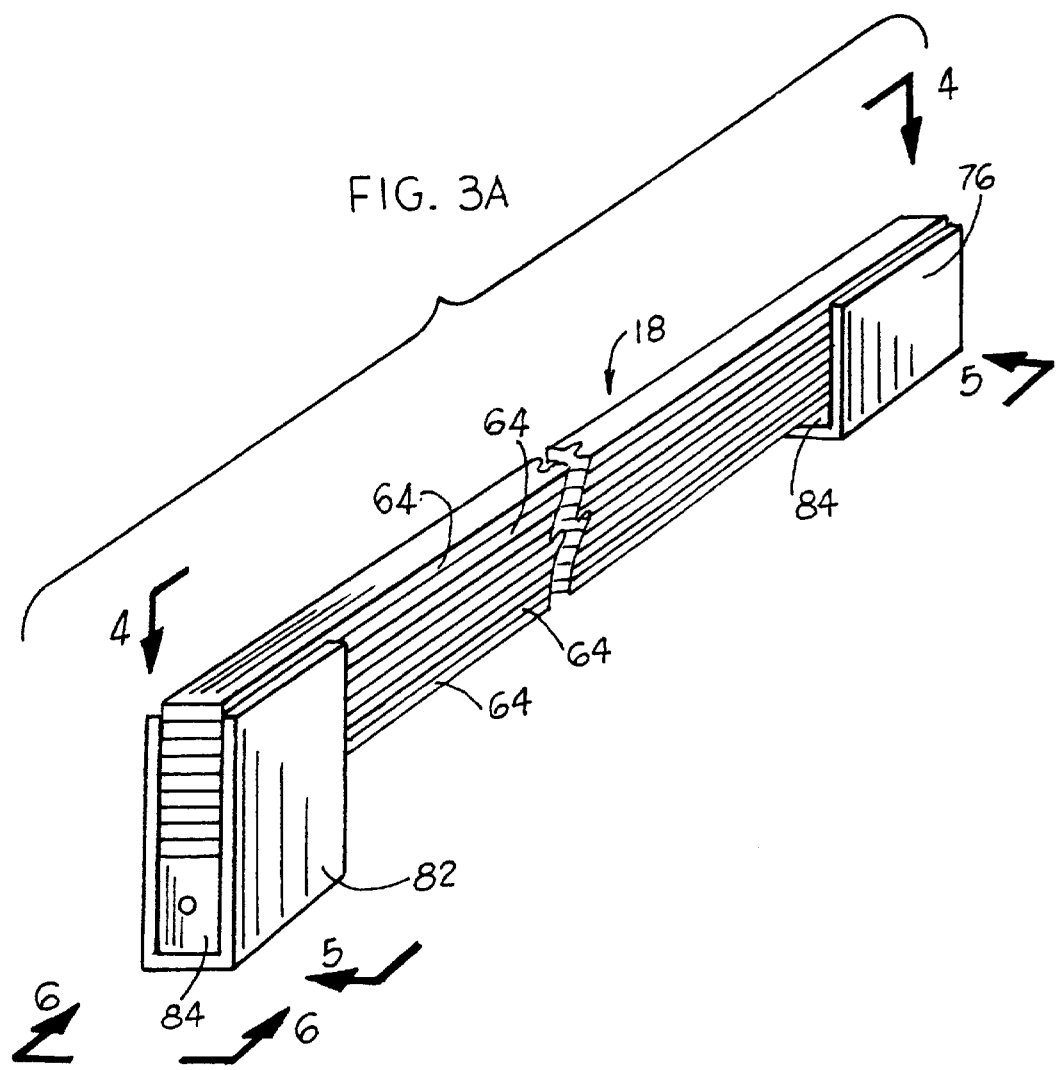
FIG. 3A is a perspective view of an HTS element of the present invention.
Figure 4:
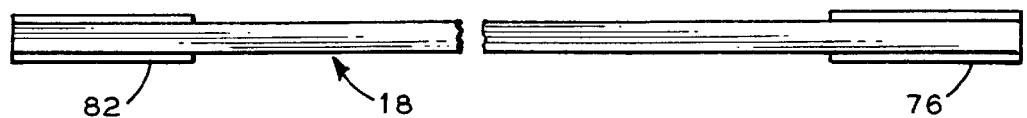
FIG. 4 is a plan pictorial view of a HTS element illustrating its end caps.
Figure 5:
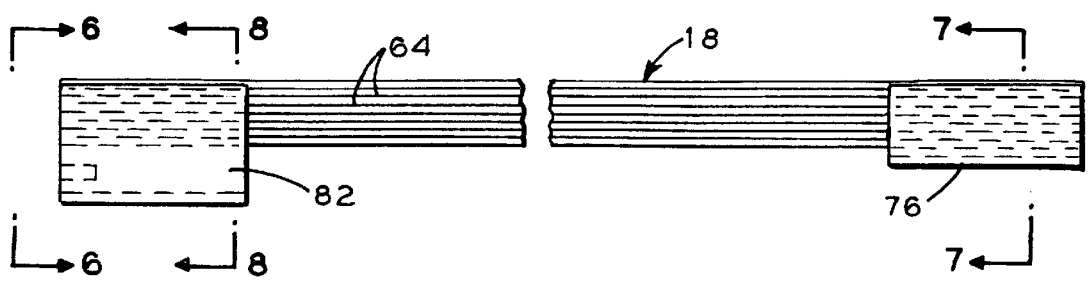
FIG. 5 is a side pictorial view of the HTS element illustrating the layers of which it is constructed.
Figure 6:
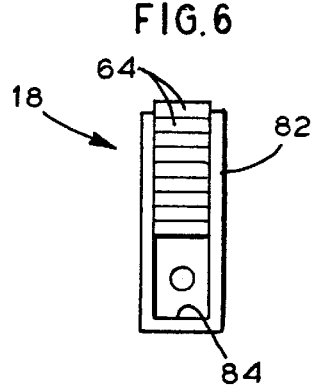
FIG. 6 is an pictorial view of the cold end of the HTS element.
Figure 8:
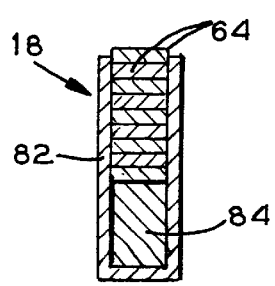
FIG. 8 is a sectional view taken along lines 8—8 of FIG. 5.
Figure 7:
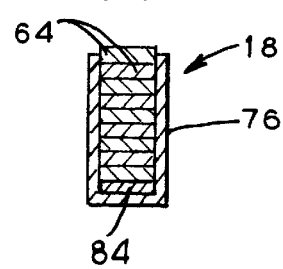
FIG. 7 is a sectional view taken along lines 7—7 of FIG. 5.

Referring initially to FIG. 1, there is shown superconductor down-lead 10 used to supply power to a superconductor. Down-lead 10 can be designed to carry a broad range of currents such as those ranging from about 1 kA to several tens of kA, more or less. As stated above, down-lead 10 is designed to carry this broad range of currents from room temperature (i.e. about 300 K) down to cryogenic temperatures (about 4 K) while at the same time reducing the overall heat leak or refrigeration load to the cryogenic environment.

Down-lead 10 generally comprises three demountable stages. The first or upper stage 12 consists of the normal or conventionally cooled current lead or bus 14. Middle stage 16 generally comprises a plurality of high temperature superconducting (HTS) elements 18 and safety lead 20. Finally, lower stage 22 generally consists of low temperature superconducting (LTS) electrical bus 24 and associated LTS cables 26. These three stages 12, 16, and 22 are modular in design so that any one can easily be replaced if damaged or if alternate superior technology becomes available.

The hybrid schematic of FIG. 1 shows the simplified electro-mechanical relationship of the three stages 12, 16, and 22 of down-lead 10. Current lead 14 of upper stage 12 is gas cooled by a cold gas (approximately 42 K to 50 K) from inlet 28 of middle stage 16 that incorporates high voltage standoff 30. At the warm end of upper stage 12 (approximately 300 K), current lead 14 incorporates gas outlet 32 and a separate high voltage standoff 34. This warm end of upper stage 12 has interconnect bus 36 which is removably connected to interconnect bus 38 of power supply lead 40.

At the cold end of upper stage 12, current lead 14 incorporates connector 42 which connects upper stage 12 to a matching connector at the warm end of middle stage 16, this matching connector being current distributor 44. An electrical bus connector 46 joins upper stage connector 42 and middle stage current distributor 44 to one end of safety lead 20. A series of HTS elements 18 are connected between current distributor 44 at one end and current collector 48 at the cold end of middle stage 16. A second electrical bus 50 joins the second opposite end of safety lead 20 to current collector 48. This second bus 50 and current collector 48 are further connected to lower stage end connector 52. Lower stage end connector 52 is, in turn, coupled to one or more stabilizers or LTS bus 24 for conduction cooling and also to LTS cable 26, which leads to an expansion loop, not shown.

This hybrid schematic of FIG. 1 is not intended to show explicitly the connections of the three stages 12, 16, and 22, nor is it intended to limit the scope of the invention. It is provided only to generally relate the components and interconnections of the stages with each other and devices with which it might be used. Furthermore, each of the above identified busses, connectors, distributors, and/or collectors will generally be constructed of copper or gold-plated copper, however, any other suitable material will also suffice.

The transition between upper stage 12 and middle stage 16 is shown in FIG. 2. In this embodiment, distributor 44 is illustrated as being threaded to connector 42 of upper stage 12 via threads 54, however, other types of connections, such as bolted, soldered, or brazed, are also likely depending on the electrical, thermal, and mechanical requirements of the particular down-lead. Usually, if a threaded connection is employed, gold plated copper might be the material of choice so as to prevent oxidation from occurring. In addition to such gold plating, the threads of both the male and female connections can be coated with indium in order to decrease the thermal and electrical contact resistance.

In accordance with this transition, cooling gas enters cooling gas inlet 28 in the warm end of middle stage 16 (i.e. current distributor 44). Passageway 56 distributes the incoming cooling gas to a variety of pathways 58 between current distributor 44 and connector 42 which ultimately extend axially back up through and cool upper stage 12 and current lead 14. As can be imagined, middle stage 16 is generally conduction cooled by its association with upper stage 12. Thus, the heat flux flowing down from upper stage 12 and the heat generated by Joule heating at the transition between upper stage 12 and middle stage 16 is removed by this heat exchange system.

Such gas cooling will generally operate in the range of about 300 K to about 4 K, more or less, as desired. For optimum efficiency and minimum temperature or heat penalty, the temperature of the cooling gas entering cold gas inlet 28 must be adjusted or designed for each particular application. In any event, the gas temperature entering the cold end of upper stage 12 (i.e. the warm end of middle stage 16) must be kept well below the superconducting transition temperature of the HTS material at the given field and current level during peak operating conditions. Other modifications to the junction between upper stage 12 and middle stage 16 are also likely.

Figure 11:
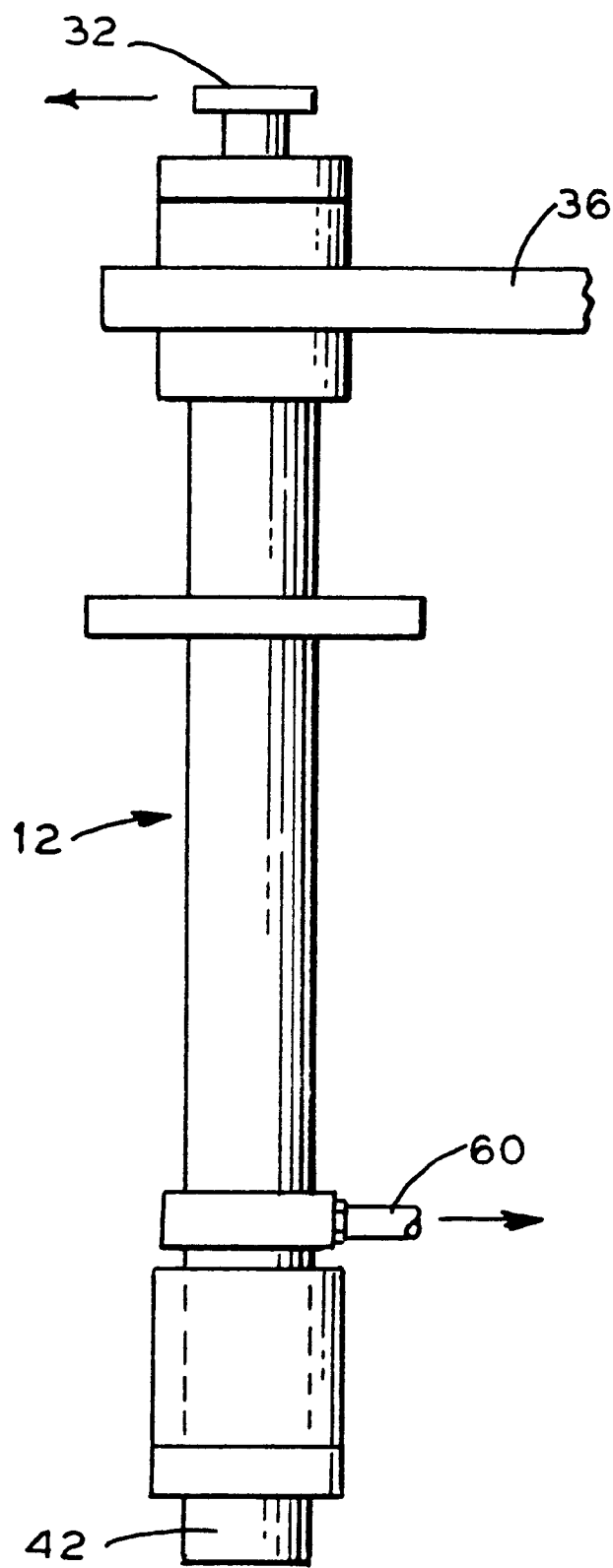
FIG. 11 is a pictorial side view of the upper stage.

An improved heat exchange system employs a large mass flow of cold cryogenic gas having a temperature of about 50 K that enters cold gas inlet 28 so as to cool upper stage 12 and current distributor 44 (and hence middle stage 16 by conduction). This large volume of cold gas acts as a heat exchange medium to absorb any heat therein. At some fixed distance along the axial length of upper stage 12 (as shown in FIG. 11), the temperature of this cold gas rises to some slightly higher temperature (such as 60 K for example). At this point, the gas flow is split so that a portion exits the upper stage 12/middle stage 16 transition region such as through gas exit 60 and standoff 62. The remaining portion of this cooling gas is allowed to pass axially back up along the length of current lead 14 before exiting via gas outlet 32. Such flow of cooling gas will generally exit outlet 32 at approximately room temperature (approximately 300 K). The 60 K gas stream leaving exit 60 can be returned directly back to a refrigerator or this stream can be used to cool some other portion of a neighboring device, such as thermal intercept shields for instance. Previous attempts at cooling current lead or bus 14 involved a cooling apparatus with only one upper gas outlet 32, no provisions were made for a second, separate gas exit 60 as now shown which enables more control in the gas flow in upper stage 12. It also permits for a more efficient operation of down-lead 10 by reducing the overall refrigeration load of down-lead 10.

Referring now to FIG. 3, there is shown middle stage 16 which incorporates a variety of individual HTS elements 18 mounted therein. These elements 18 are arranged in a spaced parallel array around the circumference of safety lead 20. This reduces the self field effects as compared to the use of a single large capacity current element of course, the number and capacity of the individual HTS elements 18 can vary as needed.

FIGS. 4–8 disclose, in more detail, one method of constructing HTS elements 18. As shown, each HTS element 18 consists of a multitude of parallel HTS tapes 64 (which sometimes number 20 to 30 tapes or so) that are vertically stacked and joined together by sintering to form a single composite HTS current carrying element 18. However, it is possible to stack tapes 64 in such a manner as to further reduce the self field configuration of each individual element 18. For example, vertically stacked tapes 64 could be sintered next to horizontally stacked tapes 64, and so on, in order to produce the least self field configuration of elements 18. Of course the number and rectangular cross-sectional area of the individual tapes 64 can vary with such parameters also determining the current carrying capacity of the assembled element 18. Also, the manner of combining such tapes 64 can vary and include using techniques such as sintering, soldering, adhesives, mechanical clamping, etc. The HTS material chosen in this embodiment was $Bi_{1.8}Pb_{0.2}Sr_2Ca_2Cu_3O_x$, or Bi-2223 but other HTS materials are equally likely. The process chosen to form the Bi-2223 HTS material of this embodiment was the powder-in-tube process, but other fabrication processes are equally likely.

Because a wire or tape type HTS material was chosen for this embodiment, the length of these elements 18 can vary as needed (up to several meters) to fit dimensional constraints or to meet most heat leak requirements. The version disclosed in the drawings employs a number of elements 18 each having a length of about 0.5 meters. Of course, the manner of constructing HTS elements 18 will also affect their overall length since there are practical limits as to the processing length of bulk HTS material or when employing a ceramic process to construct elements 18. However, by utilizing the powder-in-tube processing technique, there are basically no practical limits to the length of elements 18. Furthermore, the wire or tape type of HTS elements 18 are much more structurally rugged and strain resistant than the ceramic type of superconducting material. Data taken on the Bi-2223 HTS material used in this embodiment demonstrate 90% of the 77 K critical current retention ($I_c I_{co}$) for applied tensile strains up to 2%.

With respect to down-lead 10, there are two basic methods by which its current carrying capacity can be adjusted. Either the number of HTS elements 18 employed can be increased or the capacity of one or more of the individual elements 18 can be altered. This latter adjustment can be accomplished by altering the number or the cross sectional area of the individual tapes 64 sintered together to form each element 18.

In order to further minimize the heat leak to the cryogenic environment, a sheath can be employed to enclose each individual tape 64 which comprises element 18. The material or coating used for this sheath surrounding each of tapes 64 (and hence elements 18) is alloyed so as to reduce its thermal conductivity. It has been found that for such a sheath employing both silver and gold (with the gold concentration being less than 15%), no sizable degradation of the critical current flowing through HTS elements 18 occurred. Other alloy materials compatible with silver, such as copper, were also tried as sheath materials. Such results have shown that even for small concentrations of copper (i.e. less than 1%), an incompatibility with the HTS material was observed by severely degrading the critical current in elements 18. However, other sheath material or alloys (such as palladium or nickel, etc.) which do not affect superconducting properties and which minimize heat leak are permissible. Also, by reducing the thermal conductivity through alloying, one can tune or adjust the length of current elements 18 to match the desired heat load. Furthermore, the slight electrical conductivity of the sheath allows for easier protection in the event of total loss of superconductivity in HTS elements 18.

Figure 9:
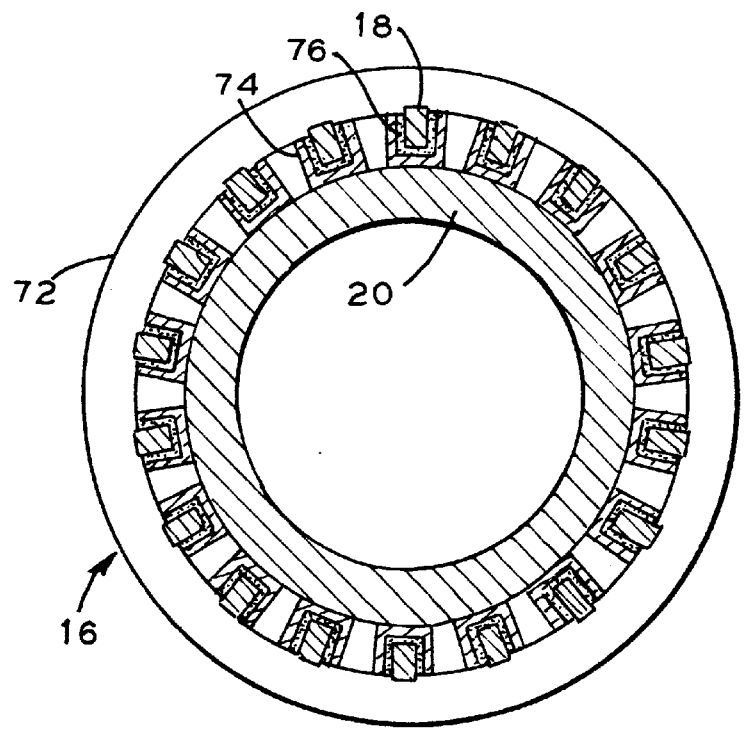
FIG. 9 is a sectional view along lines 9—9 of FIG. 3.
Figure 10:
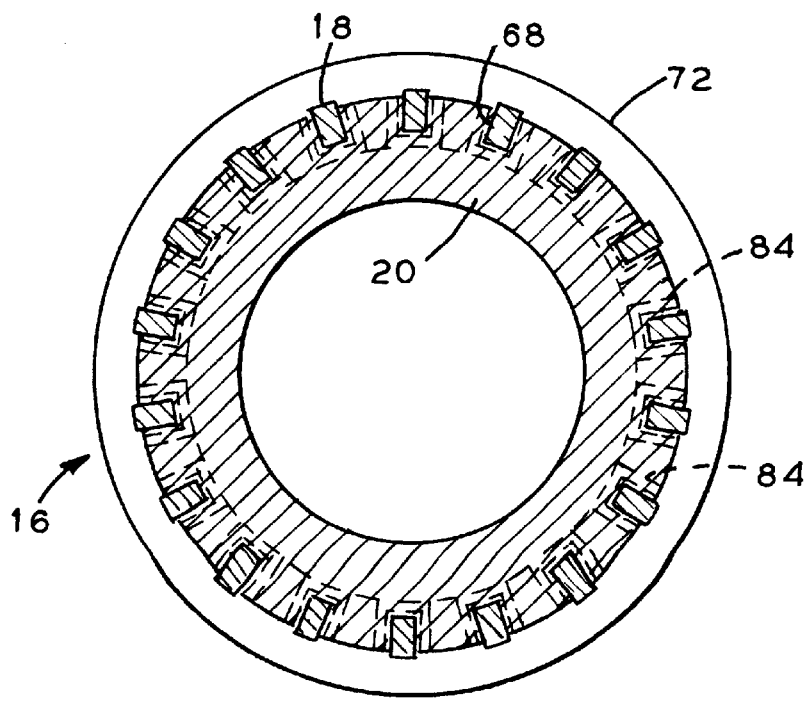
FIG. 10 is a sectional view along lines 10—10 of FIG. 3.

Referring once again to FIG. 3 and also FIGS. 9 and 10, the various HTS elements 18 are shown as being recessed within grooves or notches 68 formed in the perimeter of safety lead 20. These grooves 68 provide structural integrity to elements 18 due to the different thermal expansion and contraction between elements 18 and safety lead 20. Generally, at cryogenic temperatures, elements 18 will shrink away from safety lead 20 which results in the need for shroud 72 to encapsulate both safety lead 20 and HTS elements 18 in order to retain thermal contact between the two. This shroud 72 (generally constructed of insulating G-10 glass epoxy) shrinks more than either safety lead 20 or HTS elements 18. consequently, upon a reduction in temperature, shroud 72 will apply a radial contact pressure or clamping force between safety lead 20 and HTS elements 18 thereby locking HTS element 18 in place within groove 68. Furthermore, shroud 72 provides for the high voltage insulation of middle stage 16 (i.e. HTS elements 18 and safety lead 20).

Safety lead 20 is a built-in safety feature of down-lead 10 by protecting HTS elements 18. This protection is available whether there is or is not thermal contact according to an alternate form of the invention between safety lead 20 and HTS elements 18. Where there is thermal contact between safety lead 20 and HTS elements 18 and the latter start to heat up, their temperature rise will be much smaller due to the thermal inertia "heat capacity" of the safety lead 20. If there is no thermal contact between the safety lead 20 and HTS elements 18 and the latter start to heat up, their increasing electrical resistance will, at some point, cause current to flow through the safety lead 20 and thus reduce the flow of current through the HTS elements 18. However, if there is thermal contact, the measure of safety provided is greatly enhanced. For example, in the illustrated embodiment, HTS elements 18 are self protected up to 5000 MIITs million current-squared multiplied by the time assuming no thermal contact between the two but safety lead 20 provides a level of protection up to 20,000 (or more) MIITs assuming perfect thermal contact. A MIIT is defined by a mathematical equation that is time, area, volume, heat capacity, current, temperature and electrical resistivity dependent.

Safety lead 20 provides safety to HTS elements 18 by adding thermal mass (wall thickness) which limits the maximum hot spot temperature during interrupt conditions. Its alloy composition or length can also be adjusted to restrict or reduce heat leakage or passage to the cold end of middle stage 16. Safety lead 20 also provides overload protection to down-lead 10 by providing an alternate electrical path to carry a portion of the current during interrupt conditions. The location of safety lead 20 in down-lead 10 is kept compact by placing it within the perimeter of the circular array of HTS elements 18. Thus, some advantages of this compact design provide for both increased thermal mass and faster current diffusion into safety lead 20.

The material of safety lead 20 can vary as needed, but if magnetic shielding is not required for a particular application, then safety lead 20 can be constructed of most any 300 series of non-permeable stainless steel. However, if magnetic shielding is to be included, then safety lead 20 should be constructed of a permeable stainless steel. Should such a material change occur, it should be recognized that a cryogenically brittle material is not desirable since safety lead 20 provides structural support to HTS elements 18. Second, if a permeable steel is considered as a magnetic shield, care must be taken to mechanically anchor the entire current lead if it is to be used in the presence of an external applied field. This is due to the Lorentz forces incurred during energization of the current lead which may cause the current lead to experience undesirable forces that could result in a catastrophic situation. Finally, a detailed magnetic analysis must be performed if permeable steel is to be used as a magnetic shielding medium. This is due to the fact that permeable steel has the potential to enhance the effect at the surface of the HTS material rather than act as a shield. Of course, the actual details of this condition depends upon several factors some of which include the type and geometry of steel, the current in HTS elements 18, and the applied external field.

Safety lead 20 is designed to form a co-axial arrangement with HTS elements 18 which aids in faster current diffusion. In this fashion, should an upset condition occur, the current re-distribution into the stainless steel of safety lead 20 can occur until such time that HTS elements 18 have recovered or the current in down-lead 10 is decreased. The actual amount of current flowing into safety lead 20 will, of course, be dependent upon the length and cross-sectional area (i.e. wall thickness) of safety lead 20 as well as the magnitude of the initial disturbance. However, it should be stated that for a given length, the cross-sectional area of the stainless steel is an adjustable parameter that can be varied depending upon the safety (i.e. the number of MIITs) and thermal requirements of the particular application. These are important features since not all magnets have the same level of stored energy. Consequently, this safety lead 20 is quite adaptable at accommodating most situations that might be encountered by down-lead 10.

In order to assure uniform current distribution among each of HTS elements 18 during full current operation, a normal conducting distributor and collector resistance should be provided. The purpose of this resistance is to provide equal current sharing among the various HTS elements 18 when in the superconducting mode. Each distributor 44 and collector 48 should be precisely machined so that its individual resistance is much larger than the expected contact resistance between HTS elements 18 and its respective distributor 44 and/or collector 48. Providing a distributor 44 and/or collector 48 resistance to assure uniform current sharing among HTS elements 18 represents a conservative design. HTS materials have a much less abrupt transition from the superconducting state to the normal state (often referred to as index number N) in the presence of an applied transport current than traditional LTS materials. In fact, in steady state conditions, these materials have been demonstrated to operate safely in the flux flow regime with sizable electric field across them. Because of the more gradual transition from the superconducting to normal state (smaller N value) in the presence of an applied transport current, it is likely that even in the absence of a distributor 44 or collector 48 resistance, current re-distribution among HTS elements will occur naturally if a current element begins to go normal.

Referring now more specifically to the purpose of current distributor 44, it is understood that the current distribution among the array of elements will be determined solely by the electrical contact resistance made by each individual element 18. Such contact resistance between metallic materials can vary drastically and usually worsen in the presence of a surface layer of oxides or other contaminants. Thus, even when in the superconducting mode, a variation in contact resistance from distributor 44 to HTS elements 18 can cause a non-uniform current distribution in down-lead 10. A large variation or distribution of current among the various HTS elements 18 can result in an individual element's critical current being exceeded leading to failure.

In order to avoid such irregular flow distribution, precisely machined metallic fingers 74 forming a part of current distributor 44 are placed in series with each of the HTS elements 18. These fingers 74 are sized to accept the ends of the various HTS elements 18 therein. To further enhance contact between each finger 74 and its respective element 18, end caps 76 are secured to the ends of each element 18 which is to eventually be coupled to current lead 14. These fingers 74 have an electrical resistance several times larger than all of the expected contact resistance that might be expected to occur in distributor 44. Thus, any reasonable variation in the expected contact resistance instead shows up as a minor variation in the overall series electrical resistance or the electrical resistance of fingers 74. However, the electrical resistance of fingers 74 cannot be made arbitrarily large so as to avoid unwanted heating and thus reduce efficiency of down-lead 10.

Referring now to lower stage 22 of FIG. 1, there is shown the location of the HTS to LTS transition. Of course, lower stage 22 of down-lead 10 is kept below the transition temperature of the LTS material at the operating or designated magnetic field and current values. In the embodiment shown, the LTS material is generally aluminum or copper stabilized NbTi superconductor operating at approximately 4 K. The superconductor material embedded within a copper stabilizer consists of a Rutherford type strand of NbTi with a copper to superconductor ratio of about 1.3:1. If an aluminum stabilizer is used, it can be copper coated to facilitate splicing. For most practical designs, an expansion loop should be provided in lower stage 22 in order to account for any differential thermal contraction in the current lead mounting scheme.

For the embodiment disclosed in the drawings, lower stage 22 (i.e. LTS bus 24) is cooled using pool boiling liquid helium, however, any cooling scheme would be acceptable. The estimated heat leak from 60 K to the 4 K environment is less than about 10 watts per lead 18. This heat load includes the heat flowing through the alloyed sheath surrounding each of tapes 64 of HTS elements 18, the heat flow through each of HTS elements 18, the heat flow through safety lead 20, and the heat generated at the HTS to LTS transition.

Referring again to FIG. 3, there is shown the cold end of middle stage 16 that is to be connected to lower stage 22. As indicated, this transition between middle stage 16 and lower stage 22 is modular and can be disconnected if need be. Since this would usually be a clamped, friction, or soldered connection (as compared to a threaded connection), this transition can be disassembled by simply separating the two stages 16 and 22. Thus, should one stage fail, it will be possible to only replace the failed stage rather than the entire down-lead 10. Alternatively, should a new product become available with superior properties, this transition can be uncoupled for replacement. Please note that despite the ability to become uncoupled, the mating surfaces between all three stages (12, 16, and 22) will maintain good thermal and electrical contact by gold plating and/or indium coating of their respective copper surfaces.

As shown, cold end clamped connection 78 is electrically coupled to LTS cables 80 which, in turn, are coupled to their respective HTS element 18 via insertion into holes in end caps 82. These end caps 82 (see FIGS. 3 and 6) serve the same function and purpose as fingers 74 and end caps 76 in distributor 44. These strands of LTS wire or cable 80 are attached to the cold end of each HTS element 18 so as to provide a zero electrical resistance current path and provide axial strain relief. One option is to provide axial strain relief so that HTS elements 18 are not put into tensile strain as a result of differential thermal contraction between stainless steel safety lead 20 and HTS elements 18 during cooldown. It seems that the frictional forces existing between HTS elements 18 and gold plated safety lead 20 are not sufficient enough to lock the HTS elements 18 in place during cooldown or warm-up and elements 18 may slide with respect to safety lead 20. Spanning alongside the extension of LTS cables 80 is cold end current collector 48.

Another option is to confine HTS elements 18 in their respective groove 68 either by soldering them along their length or by increasing the frictional coefficient between the HTS elements 18 and groove 68. In this fashion, there will be lower electrical and thermal contact resistance between HTS elements 18 and safety lead 20 which allows for greater protection for HTS elements 18. However, one drawback to this approach is that the HTS elements 18 will be put into tensile strain because of the different thermal contraction rates between safety lead 20 and these elements 18. But, by employing the tape-type HTS elements described above which have a much greater tolerance to such tensile strain damage, it will be possible to utilize this approach. Should it be desirable to both solder the HTS elements 18 to safety lead 20 and also further reduce the tensile strain caused by differential thermal contraction, it will then be possible to line the grooves with a low thermal conductivity alloy block 84 similar to the alloy of the sheath surrounding each of tapes 64. It is a simple matter of brazing this alloy block 84 into the stainless steel grooves of safety lead 20 and then solder HTS elements 18 to this alloy block 84.

As indicated above, each HTS element 18 fits within a warm or distributor end cap 76 (at a temperature of about 50 K) and a cold or collector end cap 82 (at a temperature of about 4 K). The former is designed to fit into distributor 44 while the latter is designed to fit into safety lead 20. While presently these end caps 76 and 82 are custom designed to fit into position, it is anticipated that future end cap designs will provide a universal socket feature which will allow the rotation of the HTS elements 18 within groove 68. By enabling HTS elements 18 to rotate within groove 68, external applied magnetic fields can be intercepted in a direction favorable to the highly anisotropic HTS materials. Should the sintered stack of HTS elements 18 be square in cross section, no adjustment of groove 68 width or depth in safety lead 20 is necessary. However, if the cross section of HTS elements 18 is rectangular, the depth and width of groove 68 would be adjusted accordingly.

Furthermore, the current carrying capacity of HTS elements 18 increase with decreasing temperature. In other words, its cold end (at about 4 K) can carry more current than its warm end (at about 50 K). Currently, there is no grading of the number of HTS tapes 64 employed in each element 18 spanning from its warm end to its cold end. However, it is anticipated that future designs will grade or list such numbers depending on the anticipated temperature gradient. In other words, the warm end of an element 18 will be constructed with more tapes 64 than the cold end. This will reduce the amount of HTS material per element 18 thereby reducing the cost per element. Furthermore the corresponding heat leak to current collector 48 will be reduced.

To summarize, the unique features of down-lead 10 include the following: (1) the ability to include/preclude magnetic shielding of both the applied external field and the self field created by the array of HTS elements 18; (2) continuous thermal contact between the stainless steel safety lead 20 and HTS elements 18 taking into account the differential thermal contraction between the two; (3) a heat exchanger at the cold end of upper stage 12 which increases the efficiency of the overall down-lead 10 by reducing overall refrigeration load; (4) the ability to select the protection level up to 20,000 MIITs (which in turn effects the static heat load, mass, and overall dimensions) by increasing or decreasing the wall thickness of safety lead 20; (5) the ability to adjust the heat leak to the cryogenic environment by adjusting HTS element length (up to several meters) or by alloying a sheath to encapsulate the HTS elements 18; (6) the ability to adapt to most dimensional constraints due to the modularity of the three stages and the use of HTS tapes 64 which are selectable to most any length; (7) flexibility to adjusting to a different HTS material technology without a major re-design of down-lead 10; and, (8) the ability to select the current carrying capacity by selecting the number of current elements in the array or selecting the current carrying capacity of individual HTS elements 18 by selecting the total number of tapes 64 within the HTS element 18.

In addition to the above advantages of the present modular down-lead 10, this down-lead 10 can also be altered to satisfy a particular application or a broad range of applications. For example, by changing the material of safety lead 20 from a nonmagnetic stainless steel to a permeable steel (i.e. one that is suitable for cryogenic application), the material of HTS elements 18 can be shielded from the self field of the array. Also, HTS elements 18 can be constructed with a twist pitch or spiral along their length to minimize AC effects. This is most useful when down-lead 10 is used in transmission applications. Such a twist pitch or spiral can be accomplished by eliminating the straight slots or grooves 68 in safety lead 20 and replacing them with spiral cut grooves spaced along the central axis of safety lead 20, these twist pitch grooves all being concentric about the central axis of safety lead 20. Furthermore, should a superior HTS material or wire be created, or should a better manufacturing technique be developed, such new technology can easily be incorporated into down-lead 10 with little to no impact on the existing design. Additionally, the cooling design scheme shown herein can easily be changed to suit a particular need. An arbitrary example may be the need to use down-lead 10 in an application where the lower temperature end of the HTS material is 30 K and the higher temperature end is at 77 K. Other temperature ranges are also equally possible.

What is claimed is:

1. A self-protected modular high temperature superconducting down-lead for use in transmitting large currents from room temperatures to cryogenic temperatures, comprising:

(a) an upper stage having a warm end, a cold end, and a gas cooled conducting material therebetween, said upper stage further comprising means for removably electrically connecting said conducting material at both said warm end and said cold end;

(b) a middle stage having a current distributor at a warm end thereof and a current collector at a cold end thereof, said middle stage further comprising a safety lead extending between said current distributor and said curreut collector with a plurality of high temperature superconducting elements extending along said safety lead, said middle stage further comprising means for removably elecrically connecting said warm end of said middle stage to said cold end of said upper stage, said cold end of said middle stage further comprising low temperature superconducting cable means for connecting said high temperature superconducting elements to said current collector; and, (c) a lower stage comprising means for removably electrically connecting said lower stage to said current collector of said middle stage;

said safety lead having multiple grooves on an outer perimeter thereof, each of said grooves being sized to accept one of said plurality of high temperature superconducting elements, each of said high temperatne superconducting elements comprising a stack of tapes which are intimately connected to each other and extend along said safety lead, each in a respective one of said grooves.

2. A down-lead according to claim 1 wherein a thermal mass of said safety lead can be varied by varying the safety lead wall thickness, said safety lead also providing overload protection by providing an electrical by-pass to each of said high temperature superconducing elements secured thereto.

3. A down-lead according to claim 1 wherein said multiple grooves are arranged in a circle concentric with the central axis of said safety lead.

4. A down-lead according to claim 3 wherein said at least one high temperature superconducting element is soldered along its length within its respective one of said multiple grooves.

5. A down-lead according to claim 3 wherein said at least one high temperature superconducting element is only secured at opposite ends thereof to said current distributor and said current collector.

6. A down-lead according to claim 5 further comprising end caps, one of said caps secured to each of said opposite ends of said at least one high temperature superconducting element, each of said end caps being electrically coupled to said element and to one of said current distributor and said current collector.

7. A down-lead according to claim 3 wherein said multiple grooves are arranged in a spiral about said central axis of said safety lead.

8. A down-lead according to claim 3 wherein said safety lead is constructed of permeable stainless steel so as to permit magnetic shielding between said high temperature superconducting elements.

9. A down-lead according to claim 3 wherein said safety lead is constructed of a non-permeable stainless steel so as to preclude magnetic shielding between said high temperature superconducting elements.

10. A down-lead according to claim 3 further comprising a cold gas inlet located in said warm end of said middle stage, a first gas outlet located at the warm end of said upper stage, and a second gas outlet intermediate said cold gas inlet and said first gas outlet.

11. A down-lead according to claim 10 wherein said second gas outlet is located adjacent said cold end of said upper stage.

12. A down-lead according to claim 3, wherein each of said at least one high temperature superconducting element comprises a plurality of high temperature superconducting tapes sintered together.

13. A down-lead according to claim 3 further comprising a protective shroud surrounding said safety lead and each of said at least one high temperature superconducting element, said protective shroud shrinking more than said safety lead and said at least one high temparature superconducting element when cooled thereby retaining said high temperature superconducting element in contact with said safety lead.

14. A modular high temperature superconducting down-lead for use in transmitting large currents between non-superconducting temperatures and superconducting temperatures comprising an intermediate stage comprising:

a current distributor at a warm end and a current collector at a cold end thereof;

an elongated safety lead extending between said current distributor and said current collector;

at least one high temperature superconducting element located along the longitudinal axis of said safety lead;

at least one low temperature superconducting cable connecting each said at least one high temperature superconducting element to connector means for engagement with a lower stage; and a means for removably electrically connecting said warm end of the intermediate stage to an upper stage;

multiple grooves on the outer perimeter surface of said safety lead, said grooves being sized to each accept said at least one high temperature superconductor element therein;

said high temperature superconducting element being constructed of a stack of HTS tapes sintered together, each of said tapes having a rectangular cross-section.

15. A down-lead according to claim 14 wherein said multiple grooves are arranged in a circle concentric with the central axis of said safety lead.

16. A down-lead according to claim 15, wherein each of said at least one high temperature superconducting element is secured at opposite ends thereof to said current distributor and said current collector.

17. A down-lead according to claim 16, further comprising end caps secured to said opposite ends of each of said at least one high temperature superconducting element, said end caps electrically coulpling said at least one high temperature superconducting element to said current distributor and said current collector.

18. A down-lead according to claim 17 wherein said end caps are movable thereby allowing the re-positioning of said at least one high temperature superconducting element within its respective one of said multiple grooves.

19. A down-lead according to claim 15 further comprising a cold gas inlet located at said warm end of said intermediate stage, a first gas outlet located at the warm end of said upper stage, and a second gas outlet intermediate said cold gas inlet and said first gas outlet.

20. A down-lead according to claim 15 wherein each said at least one high temperature superconducting element and said safety lead are covered by a protective shroud.

21. A down-lead according to claim 15 wherein said means for removably electrically connecting said warm end of the intermediate stage to said upper stage comprises a screw connection.

* * * * *